C. W. EGGENWEILER.
METHOD OF MAKING BEARINGS OR THE LIKE.
APPLICATION FILED JUNE 18, 1921.
1,402,849. Patented Jan. 10, 1922.
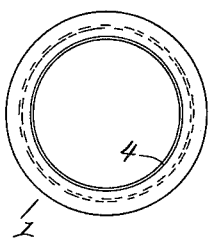
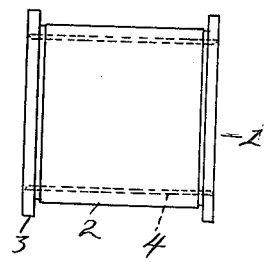
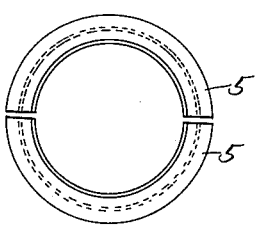
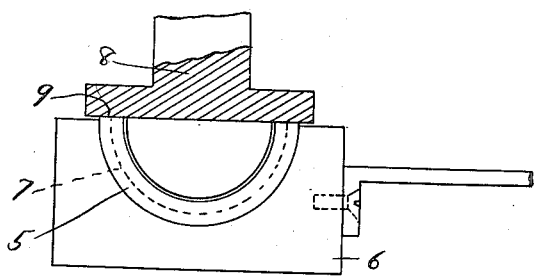
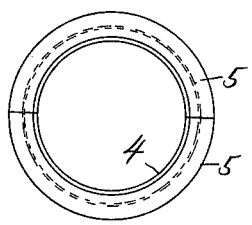
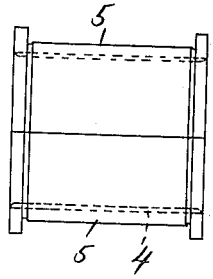
Inventor
Charles W. Eggenweiler
By Whittemore Halbert Whittemore
+Belknap   Attorneys

UNITED STATES PATENT OFFICE.

CHARLES W. EGGENWEILER, OF DETROIT, MICHIGAN, ASSIGNOR TO GENERAL ALUMINUM & BRASS MFG. CO., OF DETROIT, MICHIGAN, A CORPORATION OF MICHIGAN.

METHOD OF MAKING BEARINGS OR THE LIKE.

1,402,849.     Specification of Letters Patent.     Patented Jan. 10, 1922.

Application filed June 18, 1921. Serial No. 478,539.

*To all whom it may concern:*

Be it known that I, CHARLES W. EGGENWEILER, a citizen of the United States of America, residing at Detroit, in the county of Wayne and State of Michigan, have invented certain new and useful Improvements in Methods of Making Bearings or the like, of which the following is a specification, reference being had therein to the accompanying drawings.

The invention relates to the method of making bearings, bushings, etc., and refers particularly to the method of making bearings having lined bearing backs. The object of the invention is to form a completed bearing comprising two true semi-cylindrical members having abutting side edges, and resides in the novel features as more fully hereinafter set forth.

In the drawings:

Figure 1 is an end view of a cylindrical blank;

Figure 2 is a side view thereof;

Figure 3 is an end view of the cylindrical blank after the diametrical severing step has taken place;

Figure 4 is an end view showing the dies for operating upon each segment of the severed cylindrical blank;

Figure 5 is an end view of the completed bearing;

Figure 6 is a side view of the completed bearing.

1 is a cylindrical bearing blank having the back 2 with the radial end flanges 3 and also having the lining 4 formed of suitable material such as babbitt. The radii of the lining and the radii of the back are each greater than the corresponding radii of the completed bearing, but are such that the thicknesses of the lining and back walls are the same as those of the lining and back walls of the completed bearing. For example, when it is intended to make a bearing comprising two semi-cylindrical members and each having an internal radius of 1.119 to 1.120 inches, and an external radius of 1.375 to 1.3755 inches, the corresponding radii of the cylindrical blank are 1.139 to 1.140 and 1.395 to 1.3955 inches.

The cylindrical blank is diametrically severed to produce two segmental members 5 by means of a saw which has a cutting width of 3/64 of an inch.

The next step comprises the pressing of each segmental member 5 to reduce its radius to less than the desired radius of the completed bearing by an amount such that when the segmental member is relieved it will spring back to the desired radius of the completed bearing. As shown in Figure 4, 6 is a die block having a semi-cylindrical recess 7 with a radius of 1.3575 inches, and 8 is a cooperating plug mounted in the ram of a press (not shown) and adapted to engage the side edges 9 of a segmental member 5 to reduce the radius of the segmental member to the radius of the recess in the die block 6. With this degree of pressing the segmental member will spring back to the radius of 1.375 to 1.3755 inches when released from the die block.

The side edges 9 of the two segmental members 5 are then milled or ground to form two true semi-cylindrical members having the desired radius of the completed article, so that when these semi-cylindrical members are assembled, they form a true cylindrical bearing having the desired radius.

What I claim as my invention is:

1. In the method of making bearings or the like, the forming of a cylindrical blank of greater radius than that of the completed article, the diametrical severing of the blank to produce two segmental members, and the pressing of each segmental member to reduce its radius to less than that of the completed article by an amount such that the segmental member will spring back to the desired radius of the completed article.

2. In the method of making bearings or the like, the forming of a cylindrical blank of greater radius than that of the completed article, the diametrical severing of the blank to produce two segmental members, the pressing of each segmental member to reduce its radius to less than that of the completed article, by an amount such that when the segmental member is relieved, it will spring back to the desired radius of the completed article, and the subsequent finishing of the side edges of each segmental member to form a true semi-cylindrical member.

3. In the method of making bearings or the like, the forming of a cylindrical blank having its walls corresponding in thickness to that of the completed article and having its inner and outer faces of greater radii than the corresponding radii of the completed article, the diametrical sawing of the cylindrical blank to form two segmental members, the die pressing of each segmental member to decrease its radii to less than the corresponding radii of the completed article by an amount such that the segmental member will spring back to the desired radius of the completed article, and the subsequent finishing of the side edges of each segmental member whereby each segment will be a true semi-cylindrical member, the radii of the cylindrical blank relative to the radii of the completed article being such as to compensate for the material removed in the sawing and finishing steps.

In testimony whereof I affix my signature.

CHARLES W. EGGENWEILER.